April 5, 1932. G. E. HOWARD 1,853,003
PROCESS AND APPARATUS FOR PRODUCING SHAPED MOLD CHARGES OF MOLTEN GLASS
Filed Nov. 1, 1928 6 Sheets-Sheet 1

Witness;
Winslow O. Thayer.

Inventor;
George E. Howard
by Rotan D Brown
Attorney

April 5, 1932.   G. E. HOWARD   1,853,003
PROCESS AND APPARATUS FOR PRODUCING SHAPED MOLD CHARGES OF MOLTEN GLASS
Filed Nov. 1, 1928   6 Sheets-Sheet 2

Witness:
Winslow B. Thayer.

Inventor:
George E. Howard
by Rotan D Brown
Attorney

April 5, 1932.　　　G. E. HOWARD　　　1,853,003

PROCESS AND APPARATUS FOR PRODUCING SHAPED MOLD CHARGES OF MOLTEN GLASS

Filed Nov. 1, 1928　　　6 Sheets-Sheet 5

Witness:
Winslow B. Thayer.

Inventor;
George E. Howard
by Parker D. Bunn
Attorney

Patented Apr. 5, 1932

1,853,003

UNITED STATES PATENT OFFICE

GEORGE E. HOWARD, OF BUTLER, PENNSYLVANIA, ASSIGNOR TO HARTFORD-EMPIRE COMPANY, OF HARTFORD, CONNECTICUT, A CORPORATION OF DELAWARE

PROCESS AND APPARATUS FOR PRODUCING SHAPED MOLD CHARGES OF MOLTEN GLASS

Application filed November 1, 1928. Serial No. 316,389.

In my pending patent application, Serial Number 199,243, filed in the United States Patent Office on June 16th, 1927, I have disclosed a process for mold charge formation which is characterized by the husbanding of the glass and the lateral support of successively issuing portions of the stream. Thus the shape of the completed mold charge is largely, if not entirely, dictated by the contour of the supporting surfaces or the shape of the cavity of the receiver in which the stream is caught and husbanded.

In the process which forms a portion of the subject matter of my present invention, the shaping of the completed mold charge is effected partially by the contour of the supporting surfaces, such as the cavity of the receiver in which a part of the molten glass is husbanded; and partially by the modification by the influence of gravity of such initially imparted shape.

In my patent application, Serial Number 199,243 I illustrate the employment of the principles of the process therein disclosed by the use of a receiver comprising a plurality of superimposable partible cups so arranged and operated that the molten glass, issuing from the outlet of a feeder receptacle or other container of molten glass, as it tends to attenuate, is received and supported a short distance below the plane of severance in one of the cups, the receiver being moved downwardly at a rate approximating or slightly less than the rate of issuance from the outlet, so that the normal tendency of the stream to attenuate is counteracted and the stream is caused to swell out slightly as it accumulates in the receiver.

As further portions of the stream flow from the outlet other of the cup members are successively caused to close about the stream to impart to the molten glass thus accumulated in the receiver the shape desired for the completed mold charge, the receiver members being caused to descend at substantially the rate above referred to.

When the desired quantity has been accumulated in the receiver, the neck of glass connecting the same to the outlet is severed, and by the lateral parting of certain or all of the cups the mold charge is deposited in the waiting mold.

It is evident that the final shape of the completed mold charge is largely, if not entirely, determined by the cavity of the receiver.

One advantage of the process which forms the subject matter of application Serial Number 199,243 is that mold charges so produced have a thin, relatively hard and more or less sharply defined outer skin inclosing a mass of molten glass of relatively high fluidity, permitting a better distribution of the glass during fabrication than can be accomplished with mold charges which are formed and shaped while freely suspended and which are characterized by a thicker, softer and less sharply defined skin.

However, there are certain disadvantages which attend the use of the process disclosed in my pending patent application.

Thus, for instance, the shape of the completed gob being determined by the interior contour of the receiver, there is a lack of flexibility in forming the mold charges, a different receiver being required for each shape and size of mold charge.

Again there is a lack of uniformity in the temperature and consequently in the viscosity of the glass throughout the length of the mold charge. Thus the lower end of the mold charge, from which the neck of the parison is frequently formed, tends to be of lower temperature than the upper end, having remained longer in contact with the receiver.

In the process which forms a portion of the subject matter of my present invention, and which to some extent resembles the process of my pending patent application, I employ a receiver to catch and to a degree husband the molten glass but the final shape of the completed mold charge is not dictated by the shape of the supporting surface or surfaces of the receiver, but the initial shaping of the molten glass thereby effected is modified by the influence of gravity on the mass of glass depending from the receiver.

In the formation of a mold charge in accordance with my present process for a part of the cycle of operation portions of the glass are in contact with a supporting surfaces or surfaces and for another part of the cycle are suspended out of contact therewith, the glass adjacent to the outlet being supported and the other portions of the glass being contemporaneously suspended.

The dissipation of heat under the two conditions differs, the dissipation being usually more rapid while such surface contact exists, and thus by varying the time relation between the two conditions, the temperature of the mass of glass may be controlled within reasonable limits and thus I obtain a substantial temperature uniformity throughout the length of the mold charge.

It is evident that my new process provides for the formation of mold charges having a thin, sharply defined and relatively hard skin with an interior mass of relatively high fluidity. However, the characteristic shaping by contact with supporting surfaces modified by stretching under the influence of gravity provides for a wide range of variations of shape, accomplished by variations in the ratio or proportion of the cycle of formation during which the glass is husbanded and is in suspension.

I have also invented new and improved apparatus for forming mold charges which may be used for performing the new process which is part of the subject matter of the present application, which apparatus is also adapted to perform other processes for forming mold charges including the process of my pending patent application, Serial Number 199,243.

In the accompanying drawings, which are merely intended to illustrate a practical working of my improved process and also to disclose suitable apparatus for forming mold charges, Fig. 1 is a detail view in vertical section showing the submerged discharge outlet of a container of molten glass and one form of a receiver which I may employ to receive the glass.

Figs. 2 to 9, inclusive, are diagrammatic views illustrating stages of mold charge formation by the use of this type of receiver.

Fig. 16 is a detail view of a variable cam for raising and lowering the cup parts.

Referring first to Figs. 1 to 9, inclusive, 1 represents the floor of the feeder receptacle or other container of a supply of molten glass from which a succession of mold charges is to be formed. Said receptacle is provided with a submerged discharge outlet 2 through which the glass may flow in the form of a continuous stream, the quantity or volume of whose flow may be regulated, as by the adjustable valve 3.

4 represents shear blades which are arranged to periodically open and close beneath the outlet to detach therefrom the mold charges at the proper intervals.

The receiver, which operates beneath the outlet 2 comprises a plurality of partible cups, illustrated as three in number and each consisting of two parts or halves as shown at 5—5; 6—6; and 7—7, respectively. The cup 5—5 when closed preferably has a closed bottom while the cups 6—6 and 7—7 have open bottoms.

Figure 17:
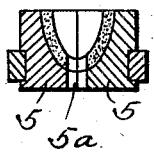
Fig. 17 is a detail in section showing the bottom section of the receiver provided with an axial opening.

However the bottom of the cup 5—5 may be partially open or be provided with an axial opening as illustrated at 5a in Fig. 17.

Suitable mechanism, hereinafter described, is provided for parting and closing said cups and arranging them in superimposed relation as will hereinafter more fully appear.

Figure 1:
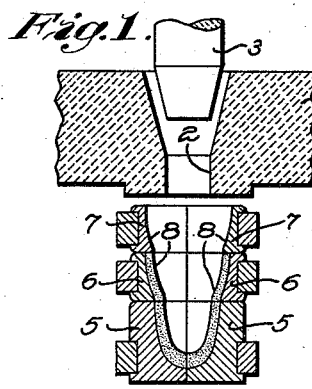

In Fig. 1 I have shown all of the cups closed and in superimposed relation beneath the outlet, but in my present process these cups are not so arranged but the cups may be so arranged for performing the process of my pending patent application Serial Number 199,243.

In the performance of my present process in connection with the partible cup receiver illustrated in Figs. 2 to 9 inclusive, the following is the cycle of mold charge formation.

Figure 9:
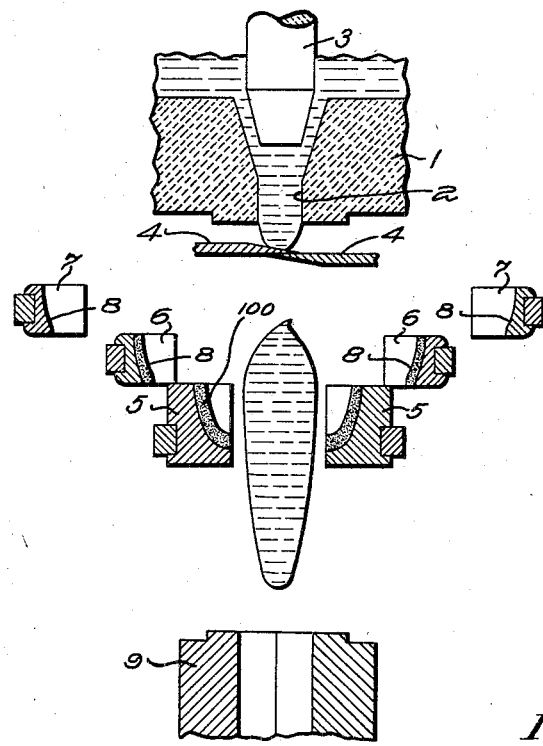

At the completion of a cycle by the shearing off the mold charge, a stub of molten glass depends from the outlet 2 and may rest on the shears 4, as shown in Fig. 9.

Figure 2:
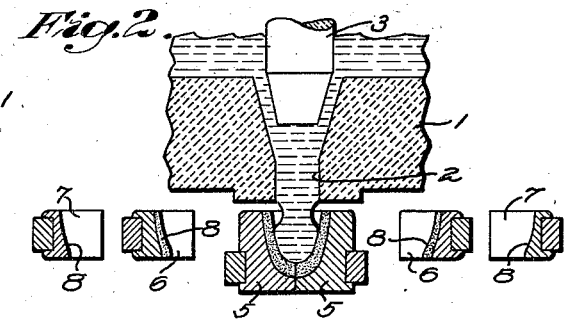

In Fig. 2 I illustrate the first stage of the formation of the next mold charge, the shears being retracted out of the way and the sheared stub having descended and being supported in the bottom cup 5—5.

The cup is closed beneath the outlet at such a distance below the lower end of the latter that the descending glass does not have opportunity to attenuate or break out of control, so that instead of lapping as the glass accumulates in the cup, the column swells out and fills the entire cross-sectional area of the cup.

The spacing of the bottom of the cup below the outlet may be roughly, under ordinary conditions, as much as from twice to three and one-half times the diameter of the outlet.

As the glass accumulates in the cup 5—5, the cup is moved downwardly at substantially the rate of filling by the molten glass or at slightly less rate, so that at all times the swelling out of the lower end of the stream will occur.

Thus the top level of the glass in the cup where it contacts with the wall of the latter is at a substantially constant distance below the outlet.

Figure 3:
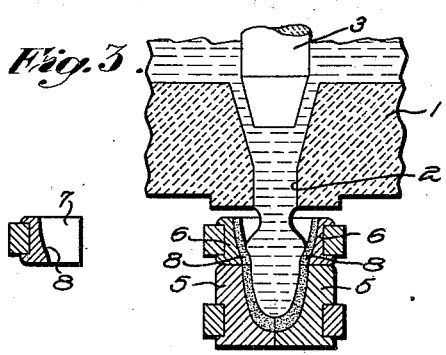

As the level of the glass husbanded in the cup 5—5 approaches the top of the latter, the intermediate cup 6—6 is closed about the stream above the cup 5—5, as illustrated in Fig. 3, the bottom of the cup 6—6 making a close joint with the top of the cup 5—5.

The glass is now being received and husbanded in the cup 6—6, the cups moving downwardly in unison at such rate that the lower end of the stream is caused to swell out as above described.

Figure 4:
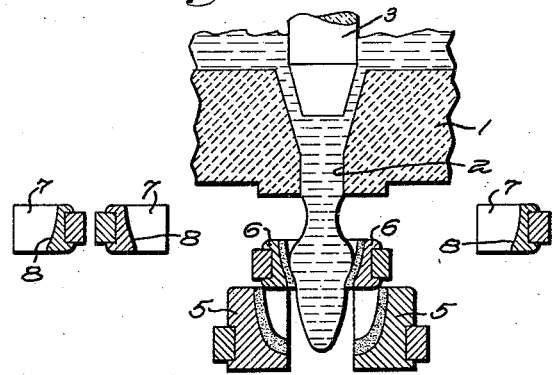

As shown in Fig 4, the bottom cup 5—5 may now be parted, thus causing the lower end of the husbanded glass to sag down under the stretching influence of gravity, thus modifying the initial shape which was imparted to that portion of the glass by its contact with the surfaces of the cup or cups.

If this downward pull on the glass were unresisted, the stream would simply sag down through the intermediate cup 6—6, but said cup and likewise the top cup 7—7 are provided with internal contractions or shoulders 8 which function to support and husband a portion of the glass received from the outlet 2.

Figure 5:
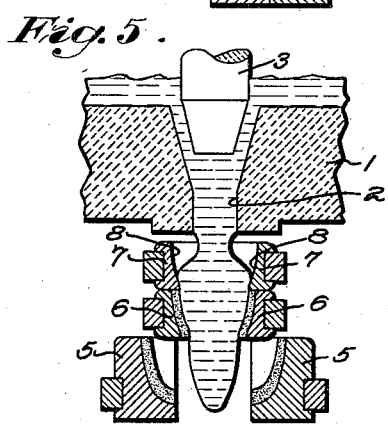

The next stage is illustrated in Fig. 5 wherein the level of the glass has risen to the top of the cup 6—6 and the top cup 7—7 has been closed about the stream above cup 6—6 and the level of the husbanded glass is rising in the cup 7—7, the cups still moving downwardly at the proper rate to prevent the material attenuation of the glass between the outlet and the cup, as above described.

Figure 6:
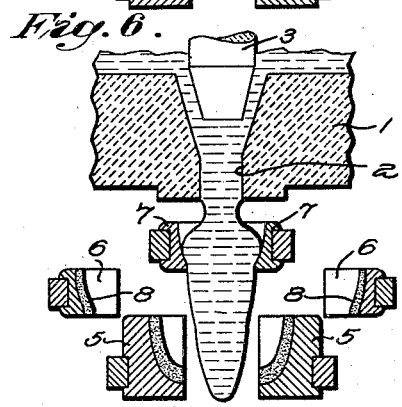

In the next stage, illustrated in Fig. 6, the intermediate cup 6—6 is parted and the mold charge is husbanded in and depends from the top cup 7—7 which continues its descent while the glass flows into it.

At the proper moment, when the husbanding and stretching functions have been accomplished, the cup 7—7 may be suddenly lowered a proper distance to stretch the neck of glass which connects the upper end of the mold charge to the outlet 2, thus producing a relatively thin neck which the shears readily sever and also forming a tapered upper end to the mold charge which is desirable in fabricating many characters of glass ware.

Figure 8:
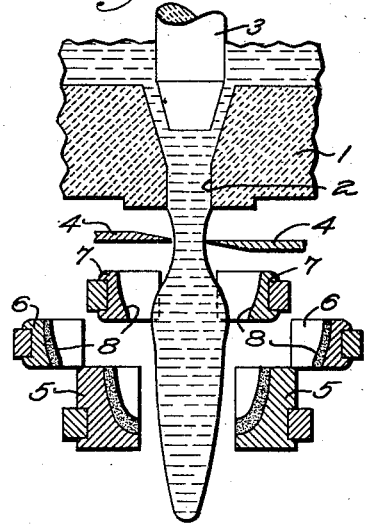

In the next stage, illustrated in Fig. 8, the shears 4—4 are closing and the cup 7—7 is parted, so that when, as illustrated in Fig. 9, the shears have closed and severed the neck, the mold charge is dropped, as for instance into the waiting mold 9.

It is evident that numerous variations and modifications in the various stages may be employed. Thus, for instance, the cup 5—5 may remain closed until the cup 6—6 is filled, or the step illustrated in Fig. 7 to attenuate the neck may be omitted and the cut be made through the unattenuated neck shown in Fig. 6, thus producing a mold charge with a blunter upper end.

From the foregoing it is evident that the final shape of the mold charge is determined, not by the shape or contour of the supporting surfaces of the receiver but that the initial shaping thus imparted by such surfaces to the glass is modified by the effect of gravity on the depending portion of the mass of glass, and that this modification is caused by a stretching action which does not destroy or materially impair the thin and relatively sharply defined and hard skin which is imparted to the glass by its contact with such supporting surfaces. I thus obtain mold charges of the superior fabricating qualities which are so desirable.

Moreover by varying the ratio between the part of the cycle during which the different portions of the glass are husbanded in the receiver and the part of the cycle during which they are subjected to the stretching effect, I am able to produce a wide range of different weights and shapes of mold charges while employing the same receiver or character of receiver.

It is also apparent that the weight or quantity of glass in a mold charge may be varied by regulating the temperature of the supply of glass in the feeder receptacle or at the upper end of the outlet, as the higher the temperature of the glass, the greater its fluidity and the faster the rate of stream flow.

Referring now to Figs. 10 to 16, inclusive, the following is a practical embodiment of apparatus which may be employed for performing my new and improved process as the same is above described, and which may also be advantageously employed to perform other processes of mold charge formation including that which is disclosed in my said patent application Serial Number 199,243.

10 represents the metallic boxing or support of the feeder receptacle which has horizontal and vertically spaced apart lugs 11 provided with vertical bearing holes in which is journaled the screw shaft 12 whose upper end is squared for the application of a wrench or other tool for rotating the shaft 12.

13 represents a casting provided at one end with a pair of horizontal and vertically spaced apart lugs 14 and 15 through holes in which the shaft 12 projects, the lower lug 15 being interposed between the lugs 11 of the boxing 10.

The hole in one of the lugs, as 15, is threaded to be engaged by the screw thread on the shaft 12 so that by the rotation of said shaft in the proper direction the casting 13 may be either raised or lowered relative to the feeder receptacle and consequently relative to the lower end of the discharge outlet 2.

Further, the casting 13 may swing on the shaft 12 as a vertical axis.

Figure 11:
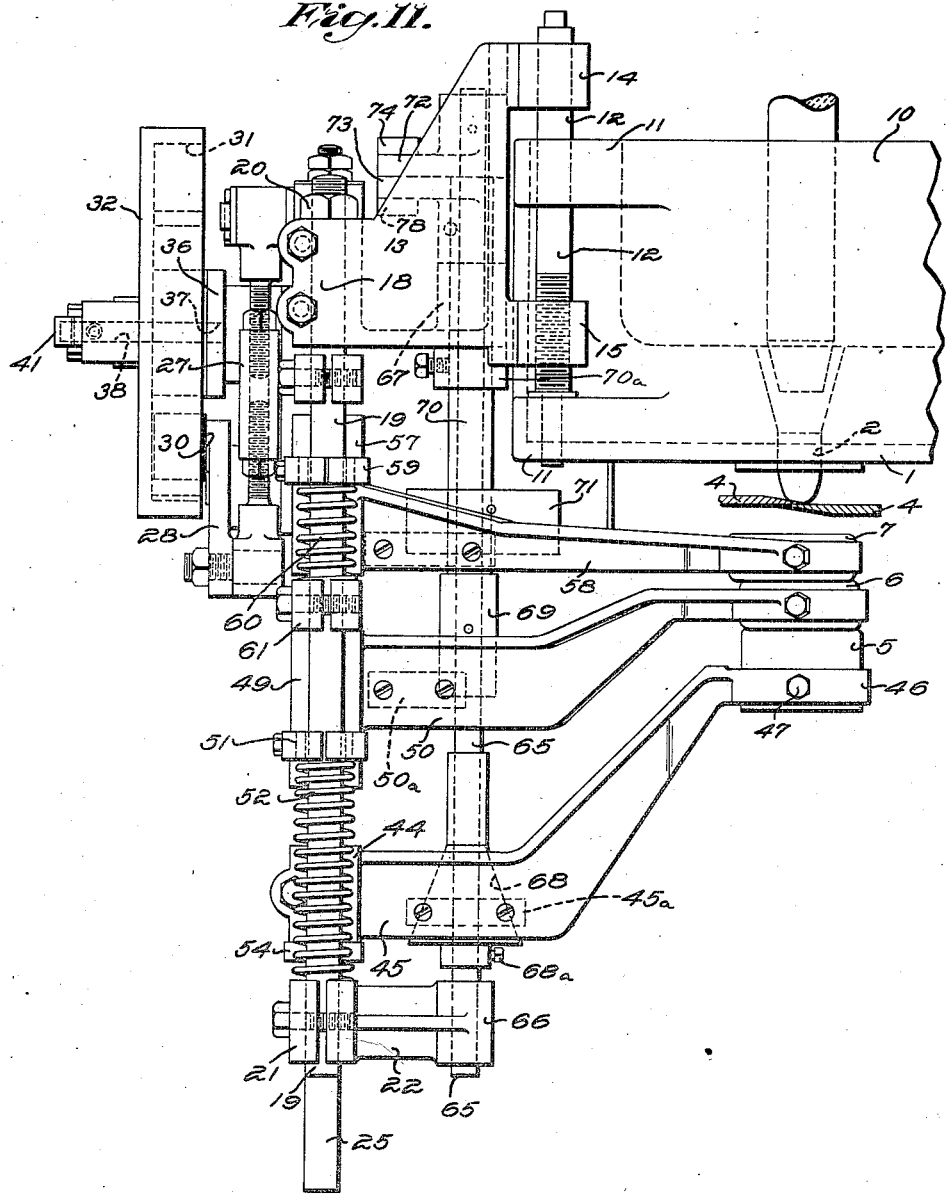
Fig. 11 is a side elevation of the same.
Figure 12:
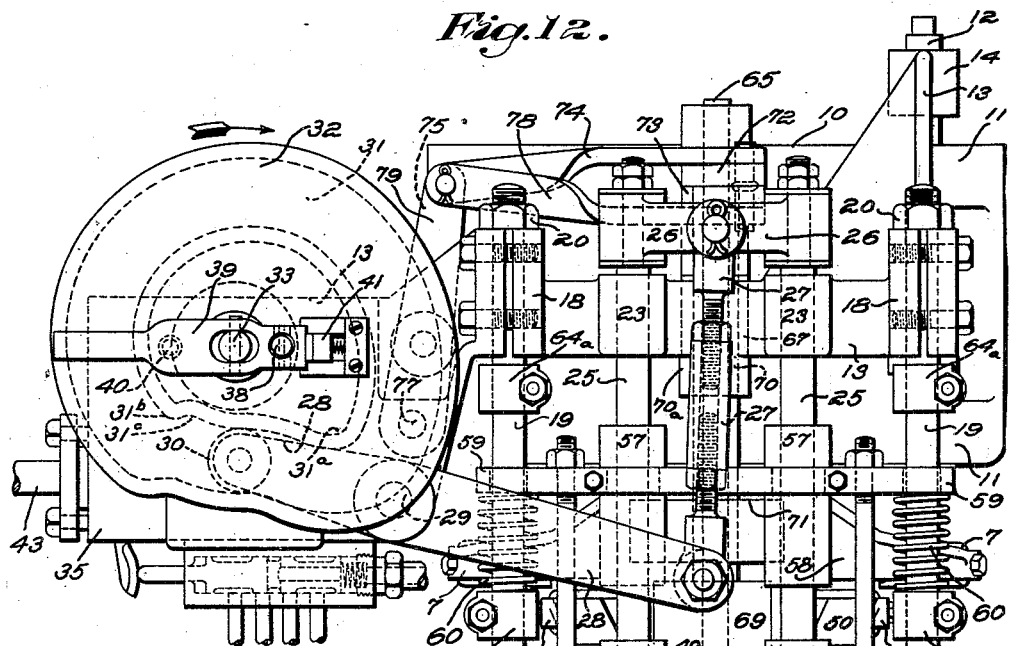
Fig. 12 is an end view of the same, looking from the left in Fig. 11.
Figure 13:
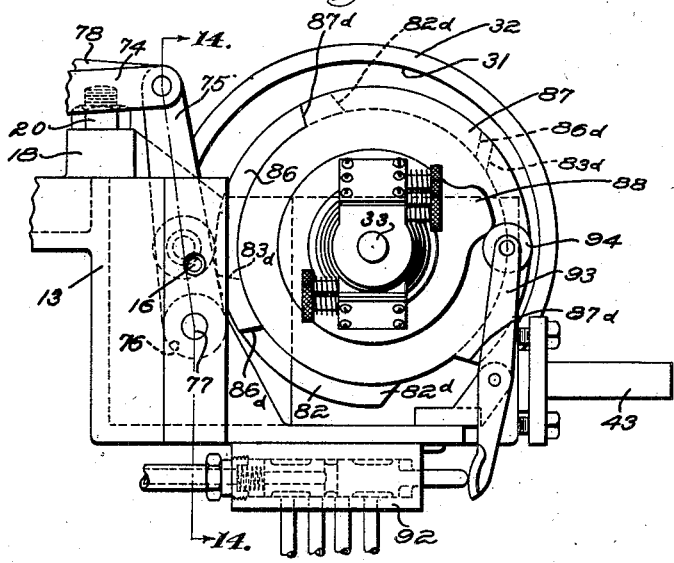
Fig. 13 is an end view of the parting-cam structure.
Figure 14:
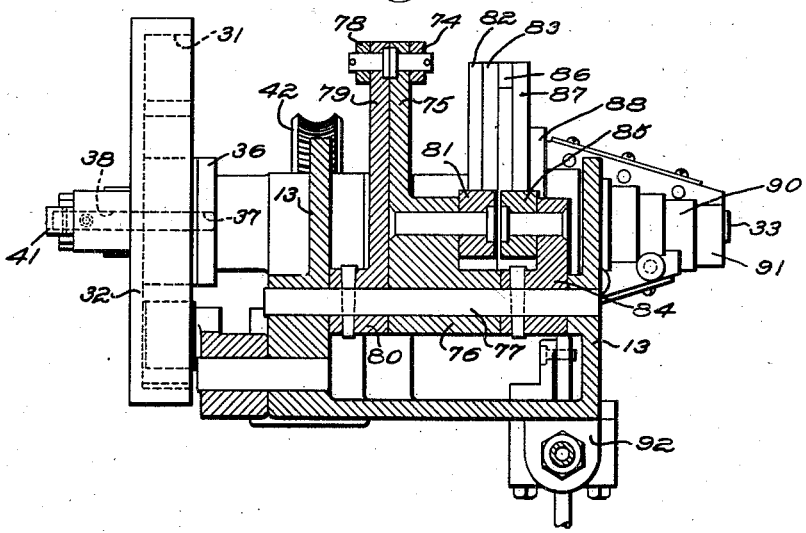
Fig. 14 is a section on the line 14—14 of Fig. 13.

When the casting 13 is swung into operative position, as shown in Figs. 11, 12 and 13, its front surface fits flat against the vertical face of the boxing 10, and it may be held rigidly in place, as by means of a cap screw 16 which extends through a pierced ear 17 of the boxing and is screwed into a threaded hole in the casting 13.

The screw may be loosened and the casting and its associated parts including the partible cups may be swung away from the outlet, thus putting the feeder out of commission.

The casting 13 is provided with a pair of vertically disposed split clamping collars 18 in which are clamped the upper end of a pair of vertically disposed and depending posts 19.

The upper ends of the posts are threaded and provided with adjustment nuts 20 which bear upon the tops of the collars 18, thus providing means for adjusting the posts longitudinally.

The lower ends of the posts 19 are clamped in the split collars 21 of a casting 22 which forms the lower end of the frame comprising the casting 13, the posts 19 and the casting 22.

The top casting 13 is also provided with a pair of vertically disposed sleeve bearings 23 and the lower casting 22 is similarly provided with the sleeve bearings 24.

25 represents a pair of vertically disposed rods each longitudinally movable and also rotatable in a pair of said bearings 23 and 24.

26 represents a cross head above the bearings 23 and in which the upper ends of the rods 25 are rotatably mounted so that the rods move vertically up and down with the cross head but may rotate relative thereto on their longitudinal axes.

The cross head 26 is pivotally connected to the upper end of an extensible link 27 whose lower end is pivotally connected to the inner and longer end of a rocker lever 28 which is pivotally mounted intermediate of its ends, as at 29, to a portion of the casting 13.

The outer and shorter end of the rocker lever 28 is provided with a roller 30 which engages the cam track 31 on the face of the cam disk 32 which is keyed or otherwise fixed on a horizontally disposed shaft 33.

The shaft 33 extends through a tubular shaft 34 which is journaled in the housing 35 which is cast integrally with or fixed to the top casting 13.

The end of the tubular shaft 34 adjacent to the cam disk 32 is provided with an annular head 36 having a pin hole 37 to receive the inner end of a clutch pin 38 which extends outwardly through a hole in the cam disk 32 and is pivoted to the end of lever 39 which is pivotally mounted intermediate of its ends on the protruding end of the shaft 33.

A spring 40 interposed between the other end of the lever 39 and the face of the cam disk normally holds the clutch pin 38 engaged in the hole 37, thus causing the cam disk to rotate with the tubular shaft 34, but by pressing the free end of the lever 39 toward the cam disk, the pin 38 may be withdrawn from the hole 37, thus unclutching the cam disk from the tubular shaft.

A spring detent 41 mounted on the face of the cam disk may be employed to engage the end of the lever 39 and thus hold the pin 38 retracted and hold the cam disk idle.

A worm gear 42 is mounted on the tubular shaft 34 and is engaged by a power driven worm shaft 43 which is journaled in the housing 35.

It is evident that when the cam disk 32 is clutched to the tubular shaft 34 the rods 25 will be reciprocated vertically, the character of their movement being determined by the contour of the cam track 31 on the outer face of said disk.

Clamped to the rods 25 above the bottom casting 22 are a pair of split hubs 44 to each of which is rigidly connected the butt end of one of the pair of cup-arms 45 whose outer ends carry the two parts of the bottom cup 5—5, the outer or free ends of the arms 45 being formed with semi-circular jaws 46 in which the cup parts are removably secured, as by the cap screws 47.

The cup-arms 45 are spring-connected, as by the helical spring 48 so that the cup-parts tend to close and remain closed.

It is evident that the partible cup 5—5 is raised and lowered relative to the outlet 2 by the up and down movements of the rods 25 which rods are rotated as the cup parts close together or move away from each other.

49 represents the two hubs of the arms 50 upon whose outer ends the intermediate cup parts 6—6 are removably mounted.

The hubs 49 are rotatably and slidably mounted on the rods 25 above the hubs 44 and are connected to slide in unison by the cross head 51 in which said hubs are free to rotate.

The cross head 51 is slidable on the posts 19 and is supported thereon by the helical springs 52 coiled about said posts with their upper ends bearing against the cross-head 51 and their lower ends against the split collars 21 of the casting 22.

The distance the hubs 49 may be separated from the hubs 44 is limited by means of a bolt 53 whose lower end is fixed in a follower plate 54 slidably carried by the rods 25 below the hubs 44, and which extends up through a hole in the cross head 51 and receives a nut 55 which bears against the cross head.

By adjusting the nut on the bolt this distance may be increased or shortened as may be required.

The arms 50 are connected together by the helical spring 56.

The hubs 57 of the arms 58, on whose free ends the parts 7—7 of the top cup are mounted, are slidably and rotatably mounted on the rods 25 above the hubs 49 and are rotatably mounted in a cross head 59 whose ends are slidably mounted on the posts 19.

The cross-head 59 and the hubs 57 are vertically positioned by means of helical springs 60 which are coiled about the post 19 and bear upwardly on the cross head 59 and downwardly on split collars 61 clamped on the posts 19.

The collars 61 also function to limit the uppermost position of the hubs 49.

The arms 58 are connected together by the helical spring 62.

The distance by which the hubs 57 may be separated from the hubs 49 is determined by the bolts 63 which span the space between the cross-heads, extend through holes in the same and have their ends provided with nuts 64 by means of which the limit of distance between the cross-heads may be adjusted.

The uppermost position of movement of the cross-head 59 on the posts 19 is determined by the stop collars 64a which are clamped on said posts and whose positions on said posts may be varied to adjust the uppermost limit of movement of the cross-head and consequently that of the cup 7—7.

It is evident that the cup-parts must be separated against the influence of the springs and that when the separating forces are relieved, the cup parts will be closed and held closed by the springs.

I will now proceed to describe the mechanism for opening the partible cups.

65 represents a vertically disposed shaft whose lower end is journaled in a sleeve bearing 66 formed in the bottom casting 22 and whose upper end is journaled in a similar bearing 67 in the top casting 13.

Mounted upon the lower portion of the shaft 65 is an adjustable cone cam 68 which spreads apart the arms 45 of the lower cup members 5—5 as the hubs 44 move downwardly with the rods 25, the arms being provided with abutment blocks 45a which slide over the surface of the cone cam. This cone cam may be raised or lowered to vary the opening or closing of the cup parts 5—5 as may be required.

Pinned on the shaft 65 is a double cam finger 69 which is interposed between the arms 50 of the cup parts 6—6 and which when turned with the shaft 65 serves to spread apart the said arms and open the cup parts 6—6, the arms being provided with abutment blocks 50a for contact with the cam.

70 represents a sleeve rotatably mounted on the upper portion of the shaft 65 and having pinned thereon the double finger cam 71 interposed between the arms 58 of the cup parts 7—7 so that as the cam turns with the sleeve 70 the said arms are caused to spread.

The cam fingers 69 and 71 are deep enough to engage the arms 50 and 58, respectively, whether the same are raised or lowered.

The upper end of the rod 65 protrudes from the sleeve 70 and has pinned thereon the hub of a crank arm 72. Likewise the upper end of the sleeve 70 protrudes above the bearing 67 and has pinned thereon the crank arm 73.

70a is a collar fixed on the sleeve 70 below the bearing 67 to prevent upward movement of the sleeve. Upward movement of the shaft 65 is prevented by parting cam 69 which is pinned to the shaft 65 and bears against the sleeve 70 which in turn is held from upward movement. The shaft 65 and the sleeve 70 are thus capable of rotary movement only.

The crank arm 72, which is fixed to the shaft 65, is connected by the twisted link 74 with the upper end of a rocker lever 75 whose hub 76 is loose on a shaft 77 which is horizontally journaled in the casting 13.

The crank arm 73, which is fixed to the sleeve 70, is connected by the twisted link 78 with the upper end of a rocker arm 79 whose hub 80 is pinned on said shaft 77 and adjacent to the hub 76.

Adjacent to the hub 76 the lever 75 is provided with a roller 81 which maintains contact with the compound cam formed by the disks 82 and 83.

The shaft 77 has pinned thereto, on the opposite side of the hub 76 from the hub 80, a crank arm 84 carrying a roller 85 which maintains contact with the compound cam formed by the disks 86 and 87.

Figure 15:
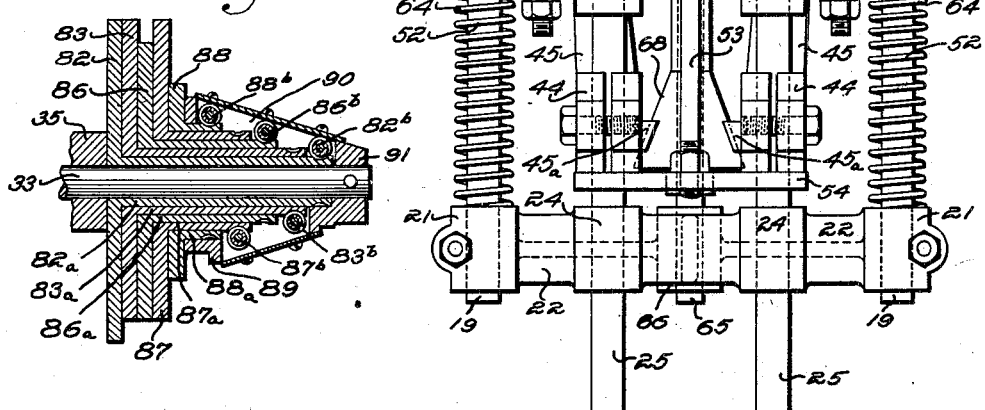
Fig. 15 is a section on the line 15—15 of Fig. 10, showing the parting cam structure.

The cam disks are provided with tubular hubs which are nested on the shaft 33, as shown in Fig. 15, the hub 82a of the disk 82 immediately surrounding and rotatable on the shaft 33, while the hub 83a of the disk 83 is rotatably mounted on the hub 82a. Likewise the hub 86a of the disk 86 is rotatable on the hub 83a, and the hub 87a of the disk 87 is rotatable on the hub 86a.

88 represents the shear cam which is provided with a hub 88a which is rotatable on the hub 87a.

The disks are held in place between a portion of the housing 35 and a ring portion 89 of a frusto-conical casing 90.

The outer ends of the hubs are stepped back relative to each other, as shown in Fig. 15, and are provided with an annular worm gear cut therein, and each worm gear is in mesh with the worm on a short shaft, represented at 82b, 83b, 86b, 87b and 88b, said shafts being journaled in the frustro-conical casing 90 carried by a hub 91 pinned on the end of the shaft 33 and by the ring portion 89.

The worm shafts protrude from the casing and are provided with finger knobs so that they may be individually turned by hand, thus rotating the corresponding disks relative to the shaft 33, while the shaft is rotating.

The disks, which are arranged in pairs, have concentric contact surfaces or "rides" which are provided with interruptions or gaps extending preferably for somewhat greater than a semi-circle. Thus in the case of the disk 87 in Fig. 13, the interruption extends between the shoulders or inclines 87d. In the case of the disk 86 the interruption extends between the shoulders 86d. 83d indicates both ends of the interruption of the disk 83, and likewise 82d indicates both ends of the interruption of the disk 82. Thus by adjusting the members of a pair of disks relative to each other the effective length of the interruption of the compound cam may be adjusted, and also the point of beginning and the point of ending of said interruption may be independently varied.

The assemblage of the parts is such that when the roller 81 is engaged with the interrupted portion of the cam 82—83, the shaft 65 is turned to rotate the cam finger 69 out of engagement with the cup arms 50 so that the cup parts 6—6 will be closed and be held closed until the roller is disengaged from the interruption and becomes engaged with the concentric portion of said cam during which engagement the cam finger is turned to engage and spread apart the cup arms and consequently open the cup parts.

By adjusting the relative length of the interruption, the time during which the cup 6—6 is closed may be varied, and also by adjusting the proper disk of the pair the moment of opening or of closing the cup may be independently varied.

By adjusting the disks 82 and 83 relative to the remaining disks the cycle of operation of the cup parts 6—6 may be varied as a unit relative to the cycles of operation of the cup parts 5—5 and 7—7 and also to that of the shears.

Likewise the cup parts 7—7 are closed during the engagement of the roller 85 with the interruption of the cam 86—87, and thus by adjusting said cams relative to each other the time during which the cup 7—7 is closed and the moment of its opening or closing may be varied, and also by adjusting the compound cam 86—87 as a unit the cycle of operation of the cup 7—7 may be adjusted relative to the cycles of operation of the cups 5—5 and 6—6 and of the shears.

The tension of the springs 56 and 62 is effective to hold the rollers 81 and 85 in resilient contact with the cams 82—83 and 86—87, respectively, but if desired, additional spring pressure means may be provided.

Figure 10:
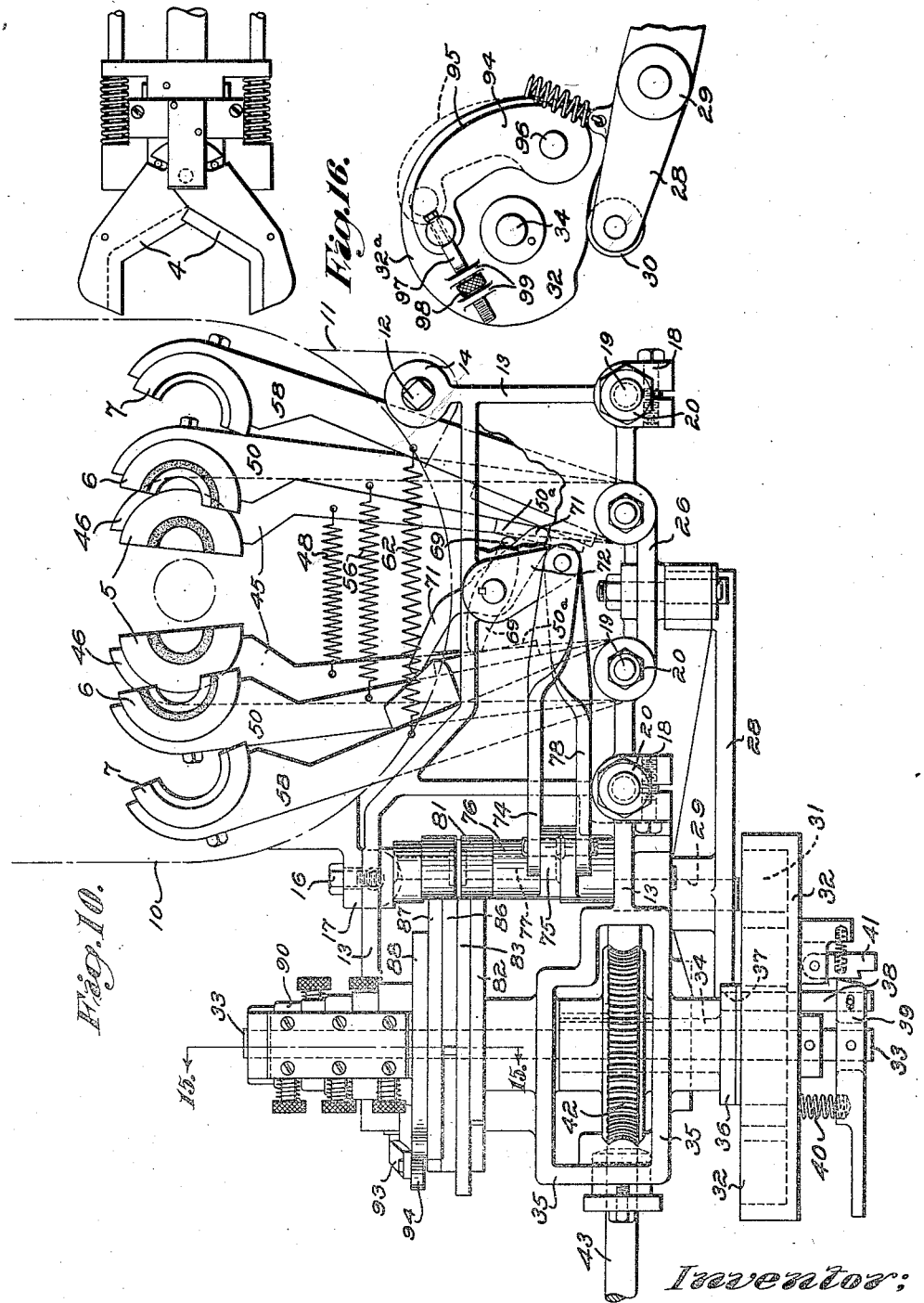
Fig. 10 is a plan view of the apparatus and its operating mechanism, the cups being shown parted, and the shears being shown in their inoperative position.

The shears 4—4 are preferably of the type illustrated in Fig. 10 wherein the blades are advanced under the outlet to close and are opened and retracted from beneath the outlet. As this type of shear is well known the same is only indicated and not described in detail.

The shears may be operated by a suitable fluid pressure cylinder and piston mechanism also well known in the art and their operation may be controlled by a valve 92 of a type also in general use in the art, which valve is shown shifted by means of a rocking lever 93 whose roller 94 is held in contact with the shear cam 88, which, as has already been explained is adjustable on the shaft 33 to obtain the desired timing of shear operation relative to the operation of the other mechanisms.

The operation of the cup control mechanism above described, to perform my new process, is as follows.

At the beginning of a cycle of mold charge formation, the shears have just cut and have opened and been retracted, leaving a shear stub depending below the outlet, as shown in Fig. 9, and the cup parts 5—5 are parted and lowered; the cup parts 6—6 are also parted and spread out beyond the parts 5—5 and positioned next above said parts, and the parts 7—7 are parted and positioned next above the parts 6—6, being spread out beyond said parts.

The rotation of the cam 32 now causes the rods 25 to rise carrying with them the hubs 44 and arms 45, thus elevating cup parts 5—5, and as said arms 45 rise they are elevated above the cone cam 68, thus permitting the cup parts to close and receive the end of the descending glass.

As the hubs 44 rise, the springs 52 expand elevating the cross head 51 on the posts 19 and thus causing the cup parts 6—6 to ascend, such ascension being in unison with that of the cup parts 5—5 because of the provision of the limiting bolt 53.

As the cross head 51 ascends, the springs 60 expand and move the cross head 59 upwardly, thus causing the cup parts 7—7 to move upwardly.

When the cup parts are in their raised positions, the cup parts 5—5 are in the center and closed, while the cup parts 6—6 are parted and disposed outside of the cup parts 5—5 and the cup parts 7—7 are parted and disposed outside of the cup parts 6—6, all the cup parts being substantially in the same horizontal plane.

The cam finger 69 is of proper length to spread the cup arms 50 widely enough apart to clear the cup arms 45, and the cam finger 71 is of sufficient length to spread the cup arms 58 far enough apart to clear the cup arms 50.

The cup arms 45 and 50 are bent up vertically so that the cup parts may be disposed as above described and as illustrated in Fig. 2.

The upward movement of the cup arms 50 ceases when the cross-head 51 comes into contact with the split collars 61 on the posts 19, and further the upward movement of the cup arms 58 ceases when the cross head 59 comes into contact with the stops 64a.

These stops are arranged so that when the cup parts are in their uppermost position they are in substantially the relative position shown in Fig. 2.

When the cup parts 5—5 are at their uppermost position the bottom of the cup is at the proper level to receive the stub which forms the lower end of the stream of molten glass before it tends to attenuate materially so that the glass will swell out and fill the full cross-sectional area of the cup.

The cam 32 in Fig. 12 is shown just past the point in its cycle of rotation wherein it depresses the rods 25 into their lowermost position, and as the cam revolves, clockwise in Fig. 12, the roller end of the rocker lever 28 is depressed, causing the upward movement of the cup parts above described.

As the point 31a of the track 31 of the cam 32 passes the roller 30, the other end of the lever 28 begins its downward movement and such movement continues until the point 31b engages the roller 30; thus moving the rods 25 downwardly.

As the cup 5—5 moves downwardly at the proper rate already described, the cup 5—5 remains closed, and as the level of glass husbanded therein approaches the top of the cup, the interruption of the cam 82—83 moves into engagement with the roller 81 causing the shaft 65 to turn and rotating the cam finger 69 into its inoperative position, thus permitting the spring 48 to close the cup parts 6—6 above the cup 5—5, as shown in Fig. 3.

Up to this point the springs 52 have held the cup parts 6—6 in their uppermost position but the bolt 53 now becomes taut between the plate 54 and the cross head 51 and thus the cup 6—6 starts to move downwardly in unison with the cup 5—5 because of the engagement of the nut 55 on the upper end of the limiting bolt 53 with the cross head 51.

As the glass level in the cup 6—6 approaches its top, the engagement of the interruption of the cam 86—87 with the roller 85 causes the sleeve 70 to turn, thus rotating the cam finger 71 into its inoperative position and permitting the spring 62 to close together the cup parts 7—7 above the cup 6—6 to receive further portions of the glass from the stream, as shown in Fig. 5.

Up to this time the cup parts 7—7 have been held elevated by the springs 60, but as the cup parts 7—7 are closing above the cup 6—6, the limiting bolts 63 become taut between the cross heads 51 and 59, and the cup 7—7 moves downwardly in unison with the cups 6—6 and 5—5.

As the cup 5—5 descends, and at the desired time its cup arms 45 are engaged and spread by the cone cam 68, thus parting the cup, as shown in Fig. 4.

As the cups continue their descent, the roller 81 passes out of engagement with the interruption in the cam 83—84 and the shaft 65 turns rotating the cam finger 69 so as to spread the arms 50 and thus open the cup 6—6, as shown in Fig. 6.

As the rods 25 approach their lowermost position the roller 85 passes out of contact with the interruption in the cam 86—87, thus turning the sleeve 70 and rotating the cam finger 71 to spread the cup parts 7—7, as shown in Fig. 8.

I provide the cam 32 with a short, abrupt fall, 31c which engages the roller 30 just before the rods 25 cease their downward movement and before the cup 7—7 is parted.

Figure 7:
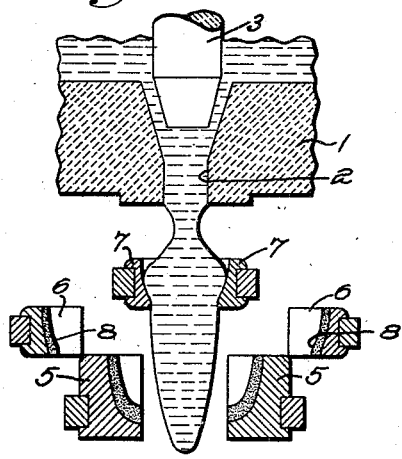

This causes a quick downward movement of the cups, resulting in an attenuation of the neck which connects the mold charge to the outlet, as illustrated in Fig. 7.

As the cup 7—7 parts the cam 88 actuates the shears which are advanced beneath the outlet and closed to sever the mold charge.

It is apparent that by the adjustment of the two disks, which form the compound cam 82—83 or 86—87, relatively to each other the period in which the corresponding cup-parts may remain parted or closed may be varied, and furthermore the instant of the parting of the cup parts or the closing of the cup parts may be independently varied relative to the cycle of operation of the corresponding cam.

Furthermore the relation of the cycle of operations of the cams 82—83 and 86—87 may be varied, and also the relation of operation of either or both of said cams to that of the cam 88 which operates the shears.

Again, as illustrated in Fig. 16, I may employ an adjustable cam for varying the vertical movements of the cup parts independently of the parting and closing movements of such cup parts.

In this case I have illustrated a cam 32a of the perimetral contact type, the roller 30 of the lever 28 engaging the perimetral edge of the cam.

94 represents a plate having a perimetral contact edge 95. The plate 94 is pivoted as at 96 to the face of the cam 32a and is adjusted by means of the screw 97 loosely attached to the free end of the plate 94 and provided with a knurled nut 98 held between the guards 99 on the face of the cam 32a. It is evident that the effective perimetral cam surface may thus be arranged for such variation as may be required to provide the desired up and down movements of the rods 25 and consequently of the cup parts.

It is evident that by the proper adjustment of the cams the partible cups may be readily arranged to operate as described in my pending patent application Serial Number 199,243, wherein all of the partible cups remain closed during the husbanding operation.

The cup parts are preferably formed of metal or some other suitable material or composition.

To prevent undesirable loss of heat by conduction I provide the cup parts with a suitable lining of heat-retaining material, such as brush graphite or a composition of graphite or clay, or graphite and some other heat retaining material.

Thus when my improved apparatus is employed in connection with the process of mold charge formation which is the subject matter of my said patent application Serial Number 199,243, and wherein the glass is caused to be built up progressively in the closed cups which thus largely determine the final shape of the mold charge, the temperature of the glass throughout the depth of the receiver tends to be ununiform owing to the fact that the glass in the lower portion of the receiver is retained or husbanded for the longer period.

To correct this tendency, I provide the partible cups with a lining of heat-retaining material, as shown at 100, and the lining is increased in thickness or effectiveness toward the bottom of the receiver, thus progressively increasing the heat-retention toward the lower end of the receiver.

Thus the longer the period during which a portion of the glass composing the mold charge is retained in the receiver, the greater the retardation of the heat loss, and thus by the graduation of the heat-retention the temperature of the mold charge throughout its vertical axis or length may be rendered substantially uniform.

It is evident that when the clutch pin 38 is disengaged from the pin hole 37, all the operating cams 32, 82—83, 86—87 and 88 are idle, and thus the mold charge forming mechanism may be put out of operation.

What I desire to claim is:—

1. The method of obtaining a mold charge from a stream of glass moving downwardly from an outlet of a glass container, comprising the steps of controlling the rate of downward movement and the initial shape of the lower end portion of the stream by applying an undersupport to the lower end of the stream and moving the undersupport downward in the line of flow of the stream while in contact with the glass, controlling the shape of a further portion of the stream by bringing the sections of an open ended sectional glass confining member to position to embrace and laterally support glass of the stream above the undersupport as the lower end of the stream moves downward under the control of the undersupport, removing the undersupport while retaining the open ended glass confining member in supporting contact with the glass of the stream, thereby causing the shape of the glass below said glass confining member to be modified by gravity stretch, and obtaining the mold charge when the desired shape thereof has been attained by cutting through the glass of the stream at a plane above the place of contact of said open ended confining member with the stream.

2. The method of obtaining a mold charge from a stream of glass moving downwardly from an outlet of a glass container, comprising the steps of controlling the rate of downward movement and the initial shape of the lower end portion of the stream by applying an undersupport to the lower end of the stream and moving the undersupport downward in the line of flow of the stream while in contact with the glass, controlling the shape of a further portion of the stream by bringing the sections of an open ended sectional glass confining member to position to embrace and laterally support glass of the stream above the undersupport as the lower end of the stream moves downward under the control of the undersupport, removing the undersupport from the lower end portion of the stream while maintaining a lateral support for a higher portion of said stream, whereby the glass below said laterally supported portion of the stream will stretch by gravity, attenuating a portion of the stream above the laterally supported portion thereof, removing the lateral support from the glass below said attenuated portion of the stream, and cutting through the attenuated portion of the stream when the glass therebelow has attained the desired shape.

3. The method of obtaining a mold charge from a stream of glass moving downwardly from an outlet of a glass container, comprising the steps of controlling the rate of downward movement and the initial shape of the lower end portion of the stream by applying an undersupport to the lower end of the stream and moving the undersupport downward in the line of flow of the stream while in contact with the glass, controlling the shape of successive portions of the stream above said lower end portion by bringing a plurality of open ended annular glass confining members successively into position to embrace and laterally support such portions of the stream, removing the undersupport and the respective open ended glass confining members in succession, beginning with the undersupport, whereby the shape of the glass below the uppermost of said open ended glass confining members will be modified by gravity stretch before the removal of said uppermost glass confining member, attenuating the glass above said uppermost glass confining member before the removal of the latter from contact with the glass stream, and cutting through the attenuated portion of the glass stream when the glass therebelow has attained the shape desired.

4. In apparatus for forming mold charges of molten glass, the combination with a receptacle for the glass having an outlet for the discharge of glass therefrom, of a partible receiver for the glass arranged to be positioned beneath the outlet, means for moving said receiver from the outlet while receiving glass whereby to maintain a substantially constant level relative to the outlet of the glass accumulating in the receiver, and means to part the receiver whereby to release the mass of glass.

5. In apparatus for forming mold charges of molten glass which are to be subsequently delivered to fabricating molds, the combination with a receptacle for the glass having a discharge outlet, of a receiver comprising a plurality of partible sections arranged to be moved into and out of position in superimposed relation beneath the outlet, means for parting and closing said sections in timed relation to each other, and means for moving said sections toward and away from the outlet in timed relation to each other.

6. In apparatus for forming mold charges of molten glass which are to be subsequently delivered to fabricating molds, the combination with a receptacle for the glass having a discharge outlet, of a receiver comprising a plurality of partible sections arranged to be moved into and out of a position in superimposed relation beneath the outlet, means for parting and closing said sections in variable timed relation to each other, and means for moving said sections toward and away from the outlet in variable timed relation to each other.

7. In apparatus for forming mold charges of molten glass, the combination with a receptacle for the glass having a discharge outlet, of a receiver comprising a plurality of partible sections arranged to be superimposed upon each other beneath the outlet, and operative connections whereby said sections in succession beginning with the bottom section are closed beneath the outlet and are moved downwardly to make room for the succeeding section.

8. In apparatus for forming mold charges of molten glass, the combination with a receptacle for the glass having a discharge outlet, of a receiver comprising a plurality of partible sections arranged to be superimposed upon each other beneath the outlet, and operative connections whereby said sections in succession beginning with the bottom section are closed beneath the outlet and are moved downwardly to make room for the succeeding section and are parted.

9. In apparatus for forming mold charges of molten glass, the combination with a receptacle for the glass having a discharge outlet, of a receiver comprising a plurality of partible sections arranged to be superimposed upon each other beneath the outlet, and operative connections whereby said sections in succession beginnig with the bottom section are closed beneath the outlet and are moved downwardly to make room for the succeeding section and are parted in like succession.

10. In apparatus for forming mold charges of molten glass, the combination with a receptacle for the glass having a discharge outlet, of a receiver comprising a plurality of partible sections arranged to be superimposed one on the other beneath the outlet, and operative connections whereby the bottom section is first closed beneath the outlet and moved downwardly to maintain a substantially constant level relative to the outlet of accumulated glass in the receiver and the other sections are in turn closed beneath the outlet and moved downwardly in like manner.

11. In apparatus for forming mold charges of molten glass, the combination with a receptacle for the glass having a discharge outlet, of a receiver comprising a plurality of partible sections arranged to be superimposed one on the other beneath the outlet, and operative connections whereby the bottom section is first closed beneath the outlet and moved downwardly to maintain a substantially constant level relative to the outlet of accumulated glass in the receiver and the other sections are in turn closed beneath the outlet and moved downwardly in like manner, and means whereby the bottom section is parted.

12. In apparatus for forming mold charges of molten glass, the combination with a receptacle for the glass having a discharge outlet, of a receiver comprising a plurality of partible sections arranged to be superimposed one on the other beneath the outlet, and operative connections whereby the bottom section is first closed beneath the outlet and moved downwardly to maintain a substantially constant level relative to the outlet of accumulated glass in the receiver and the other sections are in turn closed beneath the outlet and moved downwardly in like manner, and means whereby the sections are parted beginning with the bottom section.

13. In apparatus for forming mold charges of molten glass, the combination with a receptacle for the glass having a discharge outlet, of a receiver comprising a plurality of partible sections arranged to be superimposed one above the other beneath the outlet, a reciprocating support upon which said sections are carried, means whereby the movement of the support causes the bottom section to be raised and lowered relative to the outlet, means whereby the other sections are raised and lowered in sequence with the raising and lowering of the bottom section, and means for closing and parting the sections.

14. In apparatus for forming mold charges of molten glass, the combination with a receptacle for the glass having a discharge outlet, of a receiver comprising a plurality of partible sections arranged to be superimposed one above the other beneath the outlet, a reciprocating support upon which said sections are carried, means whereby the movement of the support causes the bottom section to be raised and lowered relative to the outlet, means whereby the other sections are raised and lowered in sequence with the raising and lowering of the bottom section, and means for closing and parting the sections in like sequence.

15. Glass working apparatus comprising a container for molten glass, said container having a submerged discharge outlet through which glass may issue downwardly in a stream, a device for contacting with the lower end of the stream of issuing glass and for retarding downward movement thereof, said device being movable downwardly in the line of flow of said stream, and a glass confining device comprising cooperative sections adapted to be closed about a portion of the glass above said glass stream contacting device after the latter has been moved downward to a predetermined position below said outlet.

16. Glass working apparatus comprising means for feeding glass downwardly from an outlet in a stream, a hollow device for receiving the lower end of the stream, said device being movable downwardly in the line of flow of the stream at a speed so related to the rate of issuance of glass from said outlet as to aid in controlling the shape of the glass between said device and the outlet, and a hollow sectional glass confining device adapted to be closed about the glass directly above said downwardly movable glass receiving device when the latter has been moved downward a predetermined distance from said outlet.

Signed at Pittsburgh, Pa., this 16th day of October, 1928.

GEORGE E. HOWARD.